United States Patent [19]
Thornton

[11] Patent Number: 5,176,060
[45] Date of Patent: Jan. 5, 1993

[54] TRUSS MITER ANGLE SAWS

[76] Inventor: Jack L. Thornton, 394 LaContenta Dr., Valleysprings, Calif. 95252

[21] Appl. No.: 793,886

[22] Filed: Nov. 18, 1991

[51] Int. Cl.$^5$ .......................... B23B 3/28; B23D 19/00
[52] U.S. Cl. ..................................... 83/471.2; 83/165; 83/471.3; 83/461; 83/468.1; 83/488; 144/3 R; 144/30; 144/49
[58] Field of Search .......................... 144/3 R, 30, 49; 83/165, 461, 468, 468.1, 471.1, 471.2, 471.3, 472, 473

[56] References Cited

U.S. PATENT DOCUMENTS

| | | | |
|---|---|---|---|
| 3,719,216 | 3/1973 | Tracy | 144/30 |
| 3,757,625 | 9/1973 | Pfenning et al. | 144/30 |
| 3,851,557 | 12/1974 | Vierstraete | 83/461 |
| 3,854,360 | 12/1974 | Reed | 83/471.3 |
| 4,098,310 | 7/1978 | Sanford et al. | 144/3 R |
| 4,131,143 | 12/1978 | Mayo | 144/30 |
| 4,454,794 | 6/1984 | Thornton | 83/471.3 |

Primary Examiner—W. Donald Bray
Attorney, Agent, or Firm—Robert K. Rhea

[57] ABSTRACT

An apparatus for simultaneously miter angle cutting to length the end of a wood truss web includes an upright frame having a workpiece guide path, horizontally extending through the frame. A pair of superposed angled saw blades are moved vertically by a pressure cylinder across the workpiece path which severs the workpiece to form a truss web to length while simultaneously miter angle cutting its ends on predetermined angles.

5 Claims, 2 Drawing Sheets

TRUSS MITER ANGLE SAWS

BACKGROUND OF THE INVENTION

1. Field of the Invention

This invention relates to cut-off saws and more particularly to a pair of saws for making dual miter cuts on predetermined angles on each end of a truss web preparatory to joining such web with complimentary truss forming members.

It is conventional practice at the present in the building industry to employ load bearing floor and roof truss members. Each truss member is formed by overhead and lower longitudinally extending members having vertical and angularly disposed web members extending therebetween. Each angularly disposed web member is provided at its respective ends with transverse beveled surfaces, cut on predetermined angles with respect to the longitudinal axis of the web so that one miter surface flatly contacts an overhead or underlying longitudinal truss and the companion miter surface at each end of the web flatly abuts a vertical surface of the adjacent vertical truss web.

The cut-off machinery usually employed for making these beveled cuts on truss webs has comprised a singular circular saw mounted on or supported by a work table also supporting the workpiece in which the saw or the workpiece is moved to an operative position with respect to each other to form a bevel cut at a predetermined angle. A second bevel cut on the same end of a workpiece thus comprises a second setting of the saw and cutting action on the workpiece.

This procedure of making dual angular cuts on each end of a truss web can be subject to many inaccuracies, such as the length of the web and the desired angle for the respective beveled surface.

Accordingly this invention provides a pair of adjustably positioned saws which are capable of successively, in a single pass of saw movement, cutting each end of a truss web to predetermined angles.

2. Description of the Prior Art

The most pertinent patent is believe to be U.S. Pat. No. 4,098,310 which discloses apparatus for cutting a workpiece to length and bevelling the ends thereof in which a length of lumber is longitudinally guided into the machine against a stop and clamped near its lead end.

Following its clamping, the workpiece is cut to length, the stop retracted and the clamped portion moved in a lateral direction to pass its ends between two pairs of beveling saws. The clamped portion is then returned to its starting position to be unclamped and manually moved longitudinally beyond the workpiece stop for ejection from the machine.

This invention is distinctive over this and other similar patents by providing an upright frame having a horizontal work path extending through the frame in the path of a pair of angularly disposed vertically aligned and vertically reciprocated saws which bevel cuts a workpiece to truss length on predetermined angles. Following the miter cuts on one end of one truss and the adjacent end of the remaining workpiece, the finished truss is ejected laterally from the machine.

SUMMARY OF THE INVENTION

An upright rectangular frame having front, rear and opposing sides is provided with a horizontal workpiece path adjacent its open front side along which an elongated workpiece is moved for processing.

Below the workpiece path, the frame contains a bin for receiving sawdust, chips or the like. Forwardly and the below the workpiece path, a workpiece exit or discharge ramp guides finished workpieces out of the frame in response to actuation of an ejection cylinder.

The frame includes a top vertically supporting a cut-off pressure cylinder having a horizontal plate on the depending end of its piston rod supporting a pair of motor driven circular saws, angularly adjustable as a unit relative to the workpiece for forming predetermined miter cuts on a workpiece ends when the saws are vertically reciprocated across the workpiece path.

An adjustable stop at one end of the workpiece path limits the longitudinal movement of a workpiece through the frame. Clamps secure a workpiece in position while being cut.

The principal objects of this invention are to provide a truss web saw which makes two miter cuts on respective ends of a truss web on predetermined angles thereby limiting time consuming handling of workpieces and in which the surfaces are accurate both in regard to the angle of the cuts and the length of the web and which cuts are formed rapidly and economically.

BRIEF DESCRIPTION OF THE DRAWINGS

FIG. 3 is a perspective view of a finished web.

DESCRIPTION OF THE PREFERRED EMBODIMENTS

Figure 1:
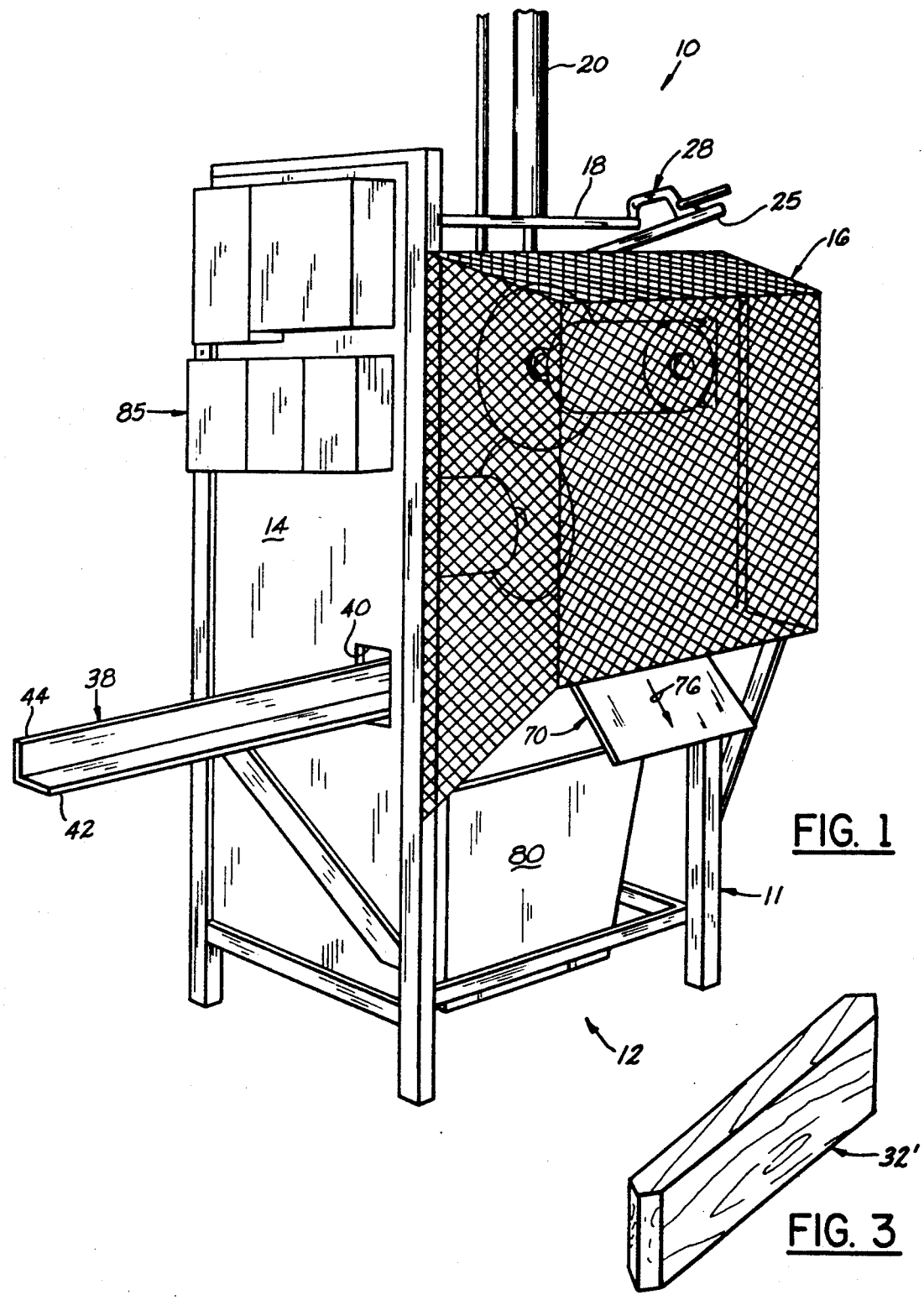
FIG. 1 is a fragmentary perspective view of the device in operative position.
Figure 2:
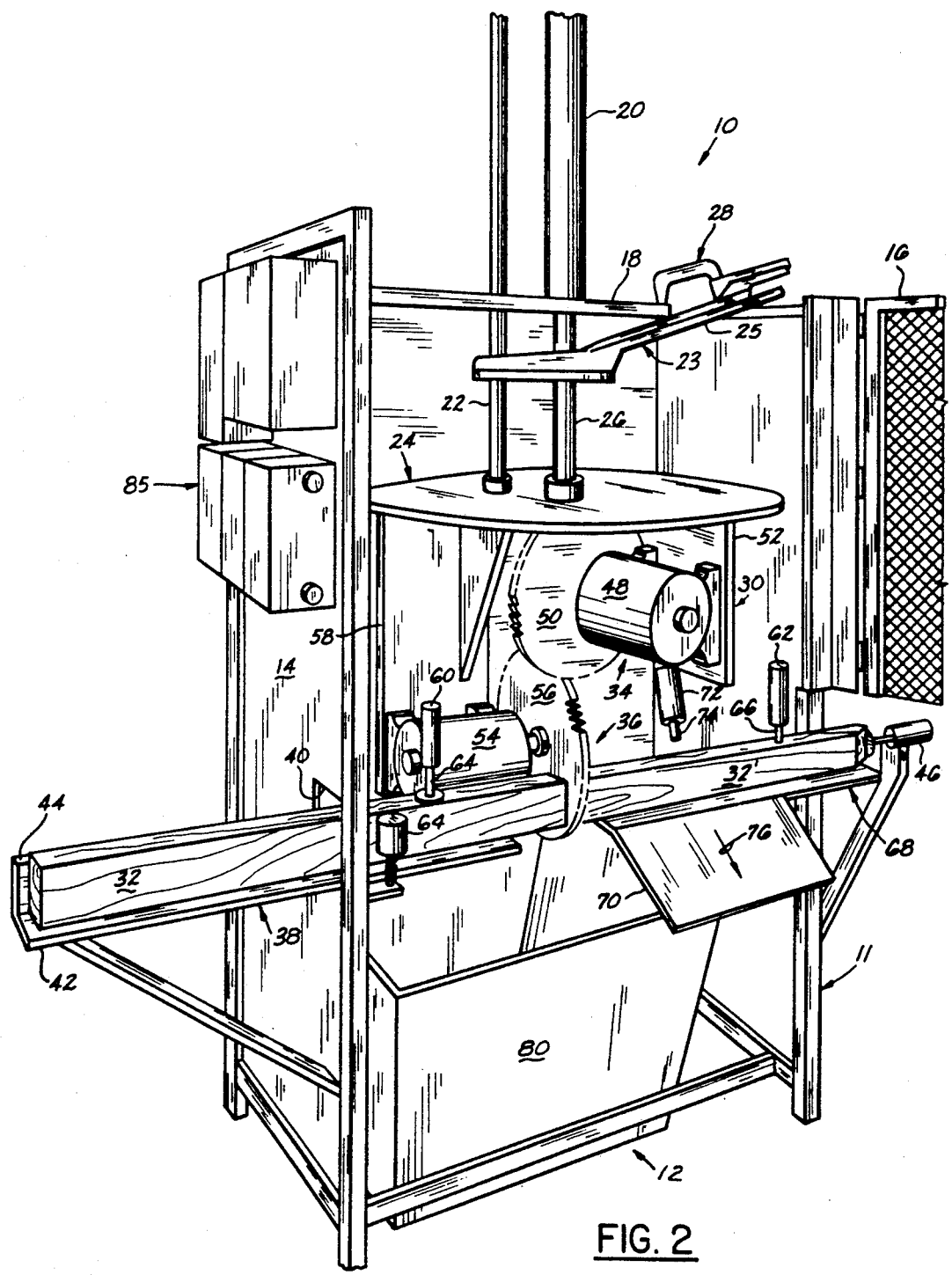
FIG. 2 is fragmentary perspective view with disk braces removed, to an enlarged scale, illustrating the apparatus in operation.

Like characters of reference designate like parts in those figures, of the drawings in which they occur.

In the drawings:

Electrical conductors and fluid pressure cylinder piping/hoses have been omitted for clarity.

The reference numeral 10 indicates the apparatus as a whole which is rectangular upright in general configuration.

The apparatus 10 is formed by a frame 11 having a forward or front side 12, a back side, not shown, and opposing sides 14, only one being shown. The front side 12 being generally open with the exception of a screen safety guard 16 normally enclosing the upper portion.

The frame also includes a top member 18 vertically supporting a main pressure cylinder, such as a hydraulic cylinder 20.

A circular plate or disk 24 is axially connected with the piston rod 26 of the cylinder 20 for vertical movement of the disk 24 as presently explained.

A disk index rod 22 is vertically connected with the disk in radial offset relation with respect to the axis of the piston rod 26 and extends upwardly through a suitable opening in the frame top 18 to act as a guide for the disk during its vertical movement and prevent angular rotation of the disk in either direction about the axis of the piston rod 26, for the reasons presently believed obvious. A generally horizontal disk index arm 23 having a pair of apertures in one end portion cooperatively slidably surrounding the piston rod 26 and index rod 22 projects toward the frame front to form a handle 25 for manually angularly rotating the disk. The index handle is equipped with a toggle clamp 28 for fixing the angular position of the disk by gripping the frame top 18 in cooperation with the handle acting as an opposing clamp jaw by contacting the depending surface of the frame top during disk vertical movement.

Companion saw means 30 comprising an upper rotary saw means 34 and a lower rotary saw means 36 is connected in depending relation with the disk 24 for vertical movement therewith and severing a workpiece 32, as presently explained.

The frame 10 is provided with a workpiece guide 38 extending horizontally through an opening 40 in the frame side 14, adjacent its forward open front 12. The workpiece guide 38 is L-shaped in transverse section having its foot portion 42 horizontally disposed and its leg 44 vertically disposed and toward the back side of the frame. The guide 38 is horizontally and axially aligned with a stop 46 at the opposite side of the frame. An upstanding friction roller 47 mounted on the frame, adjacent the inner surface of the side wall 14 bears against the forward side of the workpiece 32 to maintain it in contact with the workpiece guide leg 44 to assure accuracy of the angular cuts formed on the respective ends of a workpiece.

The saw means 34 comprises a motor 48 having its drive shaft axially connected with a rotary saw blade 50. The base of the motor 48 is mounted on the surface of a vertical plate 52 radially secured to and depending from the disk 24.

The other rotary saw means similarly comprises a motor 54 having its drive shaft axially connected with a rotary saw blade 56. The base of the motor 54 is similarly mounted on a plate 58 vertically depending from the under surface of the disk 24 and positioned relative to the disk so that the axis of the motors 48 and 54 and the vertical planes of the rotary blades 50 and 56 overlap and are respectively normal to each other.

The planes of the rotary blades 50 and 56 may be adjustably disposed by angular rotation of the disk 24 by the handle 25 to intersect and cut the workpiece 32 on angles ranging from 20°-70° to 45°-45° and form such miter angle cuts on the respective ends of truss webs 32' when the saw means and disk 24 are vertically reciprocated by the cylinder 20.

The diameter of the saw blades and their relative over lapping relation is such that one blade cuts through the workpiece 32 without the workpiece contacting the hub or drive shaft of its motor.

To accommodate the vertical reciprocating action of the saws, with respect to the workpiece path, the workpiece guide 38 terminates inwardly of the frame side wall 14 in spaced relation with respect to the vertical path of the blades 50 and 56.

A pair of solenoids 60 and 62 actuated by the workpiece 32 contacting the workpiece stop 46 extend their plungers or rods 64 and 66, respectively, downward to impinge the workpiece between the guide 38 and a discharge ramp 68 adjacent the stop 46, respectively. The discharge ramp includes a downwardly and forwardly inclined portion 70 for guiding the finished workpiece 32' out of the frame. This is accomplished by a third solenoid or hydraulic cylinder 72 which is triggered or actuated by the disk 24 closing a switch when returning to its normal upper position which energizes the solenoid 72 to extend its plunger 74 and eject the workpiece 32' out of the frame 10 in the direction of the arrow 76.

An upwardly open sawdust bin or container 80 is disposed in the bottom portion of the frame below the lowermost travel position of the blades 50 and 56 for containing sawdust and chips or the like. Obviously, a conveyer, not shown, may communicate with the sawdust bin to remove the sawdust. Similarly a conveyer, not shown, may be placed forwardly of the frame 10 to receive and remove the workpieces 32' as they are discharged from the ramp 70.

Operation

In operation, assuming the apparatus is assembled as described hereinabove and connected with a source of electrical energy as well as fluid pressure through control panel components 85 mounted on the frame side 14 for operating the saws and pressure cylinder.

A workpiece 32 moves along the guide path to contact the stop 46 at a length determined by the specifications of truss webs to be formed.

The workpiece abutting the stop 46 triggers the solenoids 60 and 62 to clamp the workpiece in place.

The operator energizes the saw motors 48 and 54 through one of the controls 85 and actuates a fluid pressure valve, not shown, for energizing the cylinder 20 to vertically reciprocate the disk 24 and saw means, which severe the workpiece 32 while simultaneously forming predetermined miter angle cuts on the trailing end of the finished workpiece 32' and the adjacent end of the workpiece 32 remaining on the guide 38.

The disk 24 returning to its uppermost normal position by the cylinder 20 triggers a switch, not shown, which energizes the solenoid 72 to eject the finished workpiece down the discharge ramp 76.

This completes one cycle of operation.

Obviously the invention is susceptible to changes or alterations without defeating its practicability. Therefore, I do not wish to be confined to the preferred embodiment shown in the drawings and described herein.

I claim:

1. Apparatus for successively cutting truss webs to length and cutting cooperating miter angles on the ends thereof, comprising:
   an upright frame having a top wall, an open front and opposing side walls;
   longitudinal workpiece guide means horizontally supported by said frame adjacent its open front for forming a workpiece path;
   means for limiting movement of a workpiece relative to said guide means;
   a pressure cylinder vertically supported by said top wall and having a depending piston rod;
   a disk horizontally supported by the depending end of said piston rod;
   an index rod vertically connected with said disk in radially spaced relation with respect to said piston rod;
   superposed rotary saw means having the planes of the saws normal to each other and normally supported by said disk above the workpiece path;
   power means operatively connected with said cylinder and said saw means for vertically reciprocating said disk and severing a workpiece to length by cutting two miter cuts on respective predetermined angles and,
   indexing means on said disk including a clamp for preventing angular rotation of the disk about the axis of said piston rod during reciprocation of the disk and saws and permitting manual angular rotation of the disk and saw means as a unit for selectively positioning the saw planes relative to the longitudinal axis of a workpiece when the clamp is released.

2. The apparatus according to claim 1 in which the rotary saw means comprises:
first and second motors each having a drive shaft; and,
first and second rotary saw blades respectively connected axially with said motor drive shafts; and,
first and second support means for radially mounting said motors on said disk with the planes of said blades disposed on predetermined workpiece miter angles.

3. The apparatus according to claim 2 in which the indexing means includes:
a generally horizontal indexing arm having a handle at one end portion and vertically slidably surrounding said piston rod and said index rod at its other end portion; and,
clamp means on said handle for gripping said top wall in combination with said handle and preventing angular rotation of said disk relative to said cylinder.

4. The apparatus according to claim 3 in which the workpiece guide means includes:
a discharge ramp for removing finished workpieces form said frame.

5. The apparatus according to claim 4 in which the limiting means includes:
a stop supported by said frame for interrupting longitudinal movement of a workpiece along the guide path; and,
other clamp means for releasably impinging a workpiece against the guide means.

* * * * *